United States Patent Office 3,451,490
Patented June 24, 1969

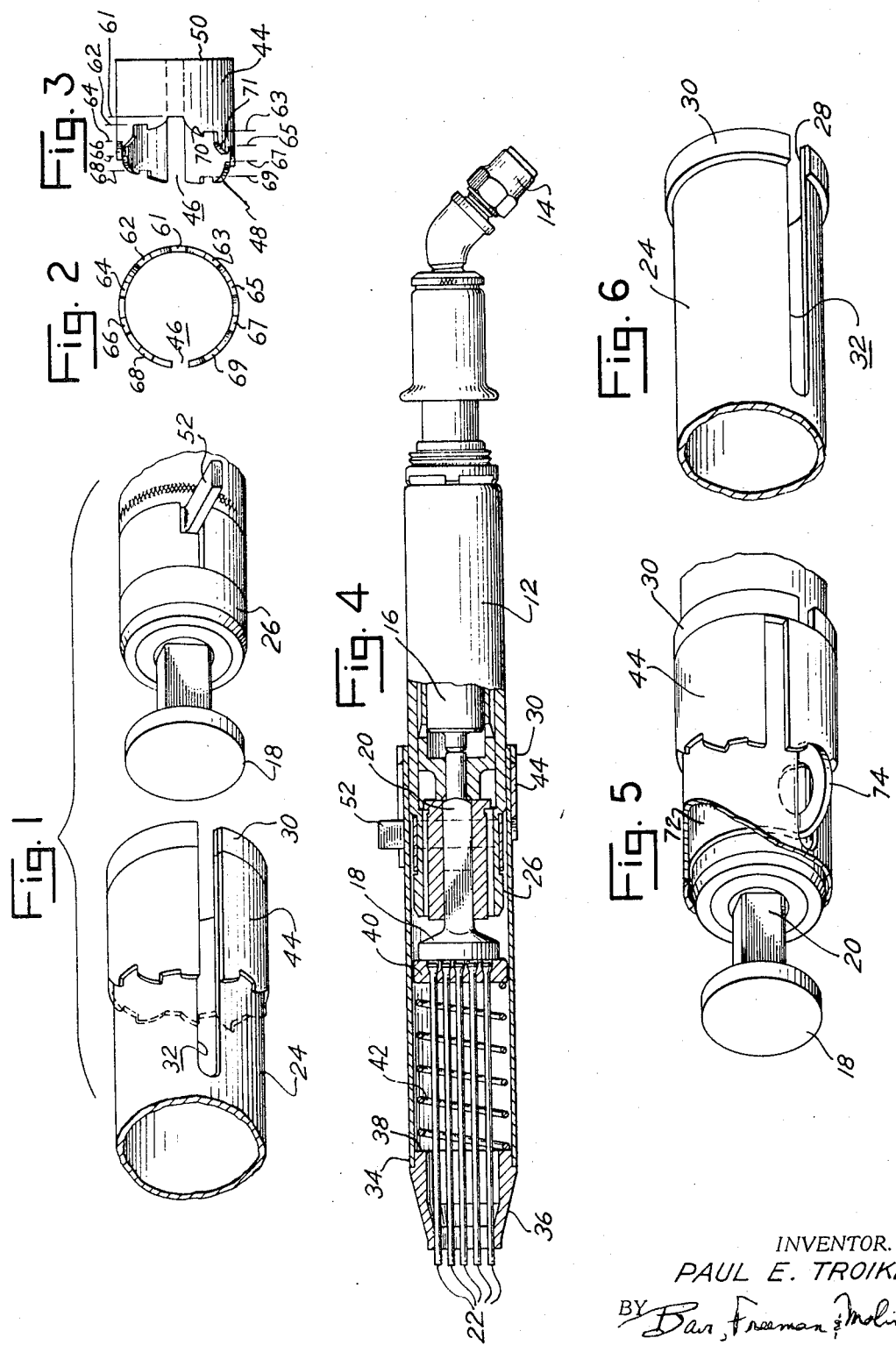

3,451,490
POWER TOOL ADJUSTMENT DEVICE
Paul E. Troike, Bryan, Ohio, assignor to The Aro Corporation, a corporation of Delaware
Filed Nov. 22, 1967, Ser. No. 685,010
Int. Cl. E21c 3/04; B23d 79/02; B21c 43/00
U.S. Cl. 173—31                                           6 Claims

ABSTRACT OF THE DISCLOSURE

A power tool attachment which controls the depth of penetration or exposure of the power instrument, such as a drill or the like. Two concentric cylinders having coincident longitudinal slots are fitted over a knob projecting out from the instrument end of the power tool. The longer inner concentric cylinder is biased away from the power tool whereas the shorter outer concentric cylinder is rotated to any one of a number of stepwise notches which engage the knob on the tool. The inner cylinder is flanged to engage the outer cylinder so that the cylinders coact to hold the inner cylinder in a precisely positioned relationship with the power instrument.

Background of the invention

This invention relates to the improvement in a power tool of an adjustment device and more particularly to an adjustment device for adjusting the exposure of the instrument of the power tool to the workpiece which the tool is shaping or altering in some way.

It is often desirable to adjust the depth which a power drill will enter a wood or metal block, or to adjust for the wear of a chipper or scaler in a pneumatic power instrument. In the past one way of making such adjustments was by using a limit device which included a single, hollow cylinder fitted over the exposed instrument of the power tool. A longitudinal slot at one end of the cylinder was guided over a projection on the power tool. After insertion of the cylinder over the end of the power tool and onto the projection, the single hollow cylinder was rotated to engage a notch in the cylinder with the projection from the power tool. Thus, the amount of exposure of the instrument from the tool was controlled by the position of the notch. Successive notches provided different limits of exposure for the instrument.

It has been found that the use of such a single cylinder construction is not entirely satisfactory because of the lack of fine control or adjustment of the exposure of the instrument from the power tool. Such fine control is a much sought after requirement.

Summary of the invention

In a principal aspect the present invention comprises the improvement of an adjustment device for a power tool of the type having a cylindrically shaped forward end with a power instrument projecting therefrom. The adjustment device is generally comprised of a first inner cylinder and a second concentric outer cylinder, the inner cylinder being adapted to slide over and engage the forward end of the power tool. The inner cylinder is biased away from the power tool whereas the outer cylinder includes a notch adapted to engage a projection from the power tool. The inner and outer cylinders are also interconnected so that the biased inner cylinder and the outer cylinder engaging the projection from the cylinder coact to gauge the exposure of the instrument extending from the forward end of the power tool.

It is thus an object of the present invention to provide an improved, adjustable power tool attachment.

It is a further object of the present invention to provide an adjustment device which is economically manufactured and can be easily attached or incorporated with existing power tools.

It is still another object of the present invention to provide an adjustment device which has a multiplicity of fine adjustments for a power tool.

One further object of the present invention is to provide an adjustment device which maintains proper engagement with the power tool at the proper adjustment setting.

These and other objects, advantages, and features of the present invention will be more fully set forth in the detailed description which follows.

Brief description of the drawing

In the description which follows, reference will be made to the drawing comprised of the following figures:

FIGURE 1 is an exploded perspective view showing the improvement of the invention in combination with a typical power tool;

FIGURE 2 is an end view of the outer cylinder of the improvement of the invention;

FIGURE 3 is a plan view of the outer cylinder shown in FIG. 2;

FIGURE 4 is a partial cross-sectional view of a pneumatic air tool in combination with the improvement of the present invention;

FIGURE 5 is a partially cut away perspective view illustrating the improvement of the invention in combination with an air tool of the type shown in FIGURE 4; and FIGURE 6 is a partial perspective view of the inner cylinder of the improvement.

Description of the preferred embodiment

While it is intended that the subject matter of the present claims may be used in combination with almost any power tool having an instrument such as a drill projecting therefrom, the following description will be directed to a needle scaler device used for chipping and cleaning materials such as rust from a workpiece. It is thus not intended that the subject matter of the present claims be limited to the scaler device to be described below, but rather should include the application of the improvement of the present invention to all those devices suitably analogous to the scaler device described below.

Referring now to FIG. 4 of the drawings, there is shown an air hammer and needle scaler attachment including the improvement of the present invention. The air hammer is of a type well known to those skilled in the art and therefore the mode of operation of the mechanism of the hammer will not be fully described. The driving mechanism is included within the body 12 of the hammer and is driven by air supplied through the air inlet coupling 14. The pressurized air supplied through the coupling 14 drives the piston 16 back and forth and this in turn drives the driver 18. The piston 16 acts on the driver 18 through the shank 20 which is rigidly attached to the driver 18. A perspective view of the driver 18 is shown in the right hand portion of FIG. 1.

Such a device is a useful tool unto itself. However, it has been found that by using the single large driver 18 along with a plurality of smaller needle drivers that rust or scale can be more efficiently removed from a surface. Thus, a plurality of needle drivers 22 are provided to act in combination with the rest of the air powered tool. The assembly for holding and directing the needles constitutes, in the presently described embodiment, the subject matter of the invention.

Referring now to FIGS. 1, 4 and 5 the needle scaler attachment includes an inner or first cylinder 24 which is adapted to slidably engage the forward end 26 of the air tool. FIG. 6 illustrates the construction of the inner cylinder 24. The inner cylinder 24 is generally cylindrical in shape and has a rear end portion 28 which has an outer circumferential flange 30 attached permanently thereto. A longitudinal slot 32 extends from the rear end portion 28 partially along and parallel to the axis of rotation of the first cylinder 24.

Referring now to FIG. 4, the inner cylinder 24 also includes a front end 34. Rigidly attached to the front end 34 of the inner cylinder 24 is a needle guide member 36. The needle guide member 36 includes a plurality of openings each adapted to slidably receive a needle 22. In the interior of the cylinder 24 a circular ridge 38 is defined by the needle guide member 36. Also included within the interior of the inner cylinder 24 is a cylindrically shaped nesting block 40 which includes a plurality of openings therethrough, each adapted to receive the end of a needle 22. The nesting block 40 abuts the driver 18 with the needles being inserted through the openings in the nesting block 40 and corresponding openings in the guide member 36. The ends of the needles 22 adjacent the driver 18 and situated in the nesting block 40 are flared and adapted to engage the flared bore openings in the nesting block 40. This prevents the needles 22 from passing through the nesting block 40. A biasing spring 42 engages the ridge 38 and the nesting block 40 and forces the nesting block in a constant, intimate contact with the driver 18. Thus, as the driver 18 is caused to reciprocate by the drive mechanism in the tool, the needles 22 are caused to follow the reciprocation of the driver 18.

Again referring to FIGS 1, 4 and 5 the improvement also includes a second or outer cylinder 44 which is concentric with the inner cylinder 24. The outer cylinder 44 has a shorter longitudinal dimension than the inner cylinder 24 and also includes a longitudinal slot 46 extending the length of the outer cylinder 44. The longitudinal slot 46 can be positioned coincident with the slot 32. The outer cylinder 44 includes a plurality of notches, described below, which are substantially perpendicular to the longitudinal axis of the cylinder 44 and which are sequentially positioned around the front end of the outer cylinder 44.

Now referring to FIGS. 2 and 3, the outer cylinder 44 includes a front end generally shown at 48 and a rear end which is substantially planar generally shown at 50. The rear end 50 is adapted to engage the flange 30 of the inner cylinder 24. The front end 48 includes a plurality of ridges or notches extending sequentially around the front end 48 of the outer cylinder 44. Each notch is adapted to engage a knob or projection 52 as shown in FIG. 1 extending out from the surface of the forward end 26 of the air tool. As can be seen in FIG. 4, the notches in the front end 48 of the outer cylinder 44 engage the projection 52 and the rear end 50 engages the flange 30 of the inner cylinder 24. The inner cylinder 24 is biased by the spring 42 causing the outer cylinder 44 to remain in snug contact with the projection 52.

Referring again to FIGS. 2 and 3, there are nine notches, 61 through 69. Each notch 61 through 69 is one level above the preceding notch beginning with notch 61 and continuing consecutively through 69. To change to the next higher notch level, the outer cylinder 44 must be rotated past the lowest notch position 61 or slot 46 and along the opposite side of front end 48. When the outer cylinder 44 is positioned on the forward end 26 of the tool and rotated to engage notch 61 with projection 52, the minimum amount of the ends of the needles 22 are exposed beyond the guide member 36. By shifting the rotatable sleeve 44 to each successive notch 62 through 69, a successively increasing length or amount of the needles 22 may be exposed. Thus, when the needles are being used on the job and are caused to wear down because of use, the wear can be compensated for by adjusting the outer cylindrical sleeve 44 to a different notch.

Each notch 61 through 69 is defined on the front end 48 and is substantially perpendicular to the axis of rotation of the cylinder 48. The width of the notch is substantially equal to the width of the knob or projection 52. To insure that the projection 52 will remain locked in position despite any vibration of the tool, the sides of each notch are pronounced. For example, notch 63 in FIG. 3 has sides 70 and 71 which prevent projection 52 from slipping out of notch 63.

An important advantage of the construction of this invention is the amount of adjustment possible because the entire circumference of the outer cylinder 44 may be utilized to provide notches to engage the projection 52. Such adjustment has not been possible heretofore. As such, more utility is realized from the scaling needles 22 because they can be adjusted for longer use. In addition, when the device of the present invention is utilized with other power tools, the utility of a greater range of adjustments is obvious.

As an alternative to the projection 52 extending from the tool shown in FIG. 1, there can be provided a clamp band 72 as illustrated in FIG. 5. The clamp band 72 is wrapped around the outer perimeter of the air tool with the end of the clamp band 72 extending outwardly from the air tool as a tab or projection 74. By using such a clamp band construction in combination with the remainder of the apparatus as described above, those tools which are presently incapable of cooperating with the apparatus of the present invention may be easily converted or adapted to cooperate with the device of the present invention.

In practice the adjustment device including the inner cylinder 24 and outer cylinder 44 is slidably positioned on the front end 26 of the power tool. The longitudinal slots 32 and 46 are coincident as the cylinders 24 and 44 slide onto the power tool past the projection 52. Then the outer cylinder 44 is rotated to the desired notch 61 through 69 to expose the desired amount of needles 22. Adjustment is effected by changing notches.

What is claimed is:

1. In a power tool having a main body portion with a cylindrically shaped forward end and a tool instrument projecting from said forward end generally along the axis of rotation of said cylindrically shaped forward end, the improvement of an adjustment device attached to said forward end to control the exposure of said instrument in relation to a workpiece being operated upon by said power tool, said adjustment device including:
  a projection integral said end and projecting out from said end,
  a first cylinder having a front end and a rear end and also including a first longitudinal slot therethrough extending from said rear end partially toward said front end, said first cylinder adapted to slidably engage said forward end, said projection being slidably positioned within said first slot,
  a concentric second cylinder adapted to slidably engage said first cylinder, said second cylinder including a second slot coincident with said first slot and extending the length of said second cylinder, said second cylinder being shorter than said first cylinder, said second cylinder also including a rear end and a front end, said second cylinder having at least one notch at said front end of said second cylinder adapted to engage said projection when said second cylinder is slidably positioned on said first cylinder and said first cylinder is slidably positioned on forward end, said second cylinder being subsequently rotated to engage said notch with said knob to thereby prevent motion of said second cylinder beyond said projection in one direction, said instrument thereby projecting beyond said front end of said first cylinder for a distance dependent upon the placement of said notch in said second cylinder,
  means interconnecting said cylinders, and
  means for inhibiting motion of said cylinders in the opposite direction.

2. The improvement of claim 1 wherein said means interconnecting said cylinders includes a circumferential flange on said rear end of said first cylinder, said flange coacting with the rear end of said second cylinder to interconnect motion of said cylinders.

3. The improvement of claim 1 wherein said means for inhibiting motion of said cylinders in the opposite direction includes biasing means.

4. The improvement of claim 3 wherein said biasing means includes a spring internal said first cylinder compressed between the front end of said first cylinder and the forward end of said tool.

5. The improvement of claim 1 including a plurality of notches each adapted to provide different exposure of said instrument to a workpiece.

6. The improvement of claim 5 wherein said notches are equidistantly spaced around the outer circumference of the front end of said second cylinder such that the relationship of said instrument with said workpiece can be stepwise controlled by positioning any one of said notches in contact with said projection.

References Cited

UNITED STATES PATENTS

| 3,086,530 | 4/1963 | Groom | 30—367 X |
| 3,150,888 | 9/1964 | Parker | 29—81 X |
| 3,343,246 | 9/1967 | Kelley et al. | 29—81 |

ERNEST R. PURSER, *Primary Examiner.*

U.S. Cl. X.R.

15—93; 29—81; 30—164.8, 277; 173—132